United States Patent [19]

Anderson

[11] 4,209,991
[45] Jul. 1, 1980

[54] DYNAMIC POSITIONING OF SEA THERMAL POWER PLANTS BY JET PROPULSION

[75] Inventor: James H. Anderson, York, Pa.

[73] Assignee: Sea Solar Power, York, Pa.

[21] Appl. No.: 943,712

[22] Filed: Sep. 19, 1978

[51] Int. Cl.² .................................................. F03G 7/04
[52] U.S. Cl. ...................................... 60/641; 114/151; 114/270
[58] Field of Search ........................ 60/641, 670, 495; 115/11, 12 R, 14; 114/151, 270

[56] References Cited

U.S. PATENT DOCUMENTS

| 4,014,279 | 3/1977 | Pearson | 60/641 X |
| 4,087,975 | 5/1978 | Owens | 60/641 |

Primary Examiner—Edgar W. Geoghegan
Attorney, Agent, or Firm—Kemon & Estabrook

[57] ABSTRACT

A sea thermal power plant is provided with pumps of the propeller type for bringing up cold water and forcing it through suitable condensers or heat exchangers and for drawing a continuous flow of warm water from a surface layer of the sea and forcing it down through suitable heat exchangers or boilers of the plant. The water so drawn from the sea flows through the heat exchangers and is subsequently discharged therefrom, which action creates thrust thereby producing forces to move the plant over the water surface. The heat exchangers are provided with deflectors which control the direction of discharge to produce a reaction force in any desired direction to drive the power plant. The pumps have associated therewith pipes which have located therein, downstream of the pumps, bypass louvres or vanes which can be opened to discharge water directly into the sea to produce a higher thrust for moving or positioning the power plant.

8 Claims, 7 Drawing Figures

PROPELLER PUMP
PERFORMANCE CURVES

DYNAMIC POSITIONING OF SEA THERMAL POWER PLANTS BY JET PROPULSION

BACKGROUND OF THE INVENTION

In a sea thermal power plant, it is important to be able to move the plant at a slow rate of speed over the surface of the water while producing power, or alternatively to be able to maintain the plant in a fixed position despite the drag forces created by winds and currents. The warm water from the surface layer of the sea is drawn into the plant by suitable pumps and directed through heat exchangers or evaporators and after giving up some heat, to boil a power producing fluid, it is rejected from the plant. Since warm water has been removed from the surface of the sea, it must be replaced by water from underneath the surface and the surface water is then slightly cooler than before. Thus, in order to have available a continuous supply of warm water, that can be drawn into the plant, it is necessary that the plant be moved about the surface of the sea.

In order to effectively move the power plant, it has been proposed to employ adjustable deflectors which would permit directing the thrust of the water rejected from the heat exchangers so as to produce thrust in any desired direction, thereby producing forces to move the plant or to position the plant with respect to the currents of the sea. While a system of this type permits thrust to be produced and directed in such a way as to position a plant, it is questionable whether enough thrust can be produced to overcome the drag forces produced by wind and currents under high storm conditions. Therefore, it becomes important to have a thrust means available, which can produce higher thrust during times when storms may occur.

SUMMARY OF THE INVENTION

The present invention is directed to the pumps of a sea thermal power plant and the equipment associated therewith for producing higher thrusts under abnormal conditions. The power plant is provided with pumps that draw the warmer surface water therethrough and direct same through evaporators or heat exchangers from whence it flows through suitable deflectors or guide means back into the sea. In addition, the power plant is provided with a pump that draws cooler water from the lower depths of the sea and delivers same to a heat exchanger or condenser from where it is directed by suitable deflectors or guide means back into the sea. Under normal conditions the water directed back into the sea from the pumps provides sufficient thrust to move the power plant over the surface of the sea.

In order to produce higher thrust forces, so as to overcome the drag forces produced by wind and currents under high storm conditions, it is necessary to provide additional thrust openings in the portion of the pipes downstream from the various pumps. This is accomplished by utilizing vanes or louvres which, while normally maintained in a closed position, are capable of being opened for discharging the greater portion of the water from the pipes directly into the sea with the remaining portion of the water flowing through the heat exchangers and then into the sea. The pivotally mounted vanes or bypass thrust openings can be installed below the pumps on the pipes delivering the warm water from the surface of the sea and on the pipe above the pump bringing cold water up from deep in the sea. Thus, all of the pumps can contribute in producing higher thrust when it is required.

DESCRIPTION OF THE PREFERRED EMBODIMENT

Figure 1:
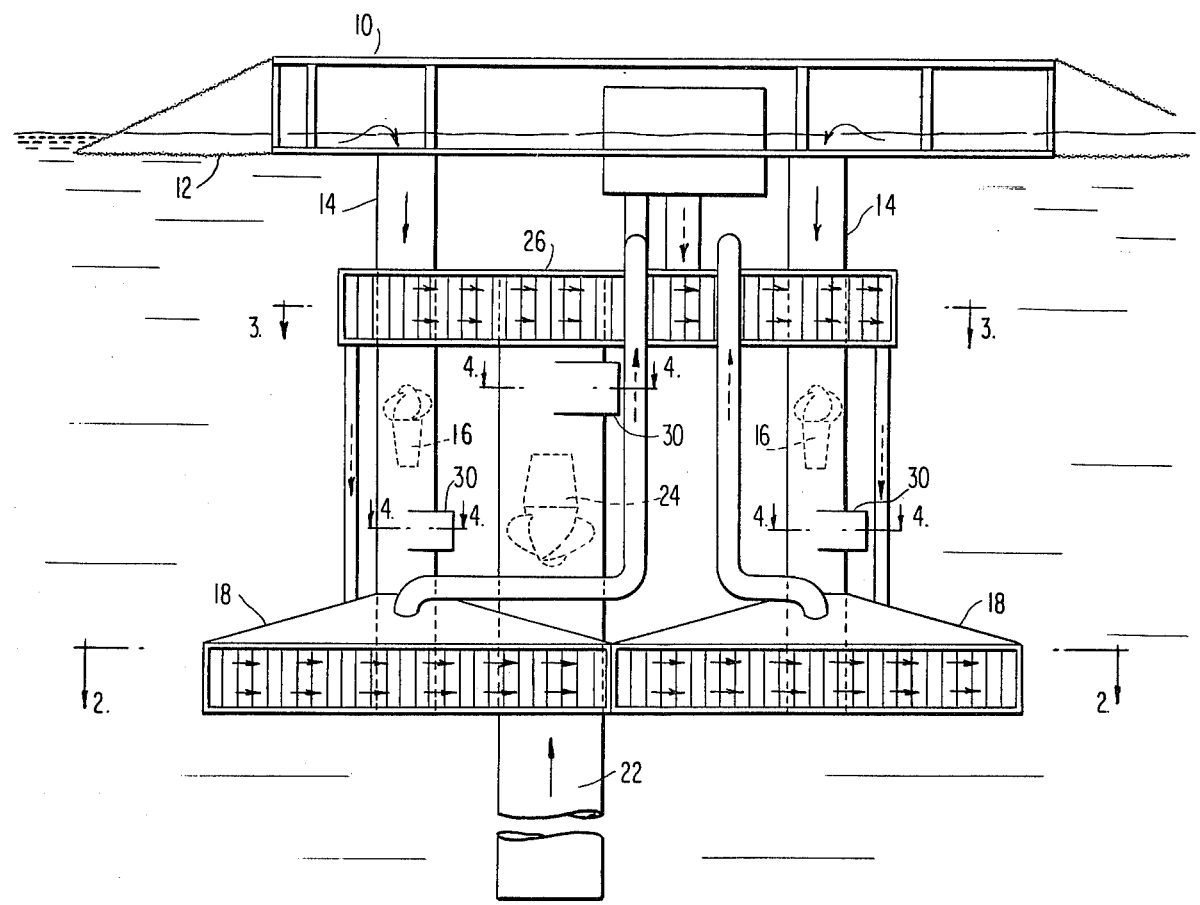
FIG. 1 is a vertical sectional view of a portion of a sea thermal power plant showing the pumps and heat exchangers.
Figure 2:
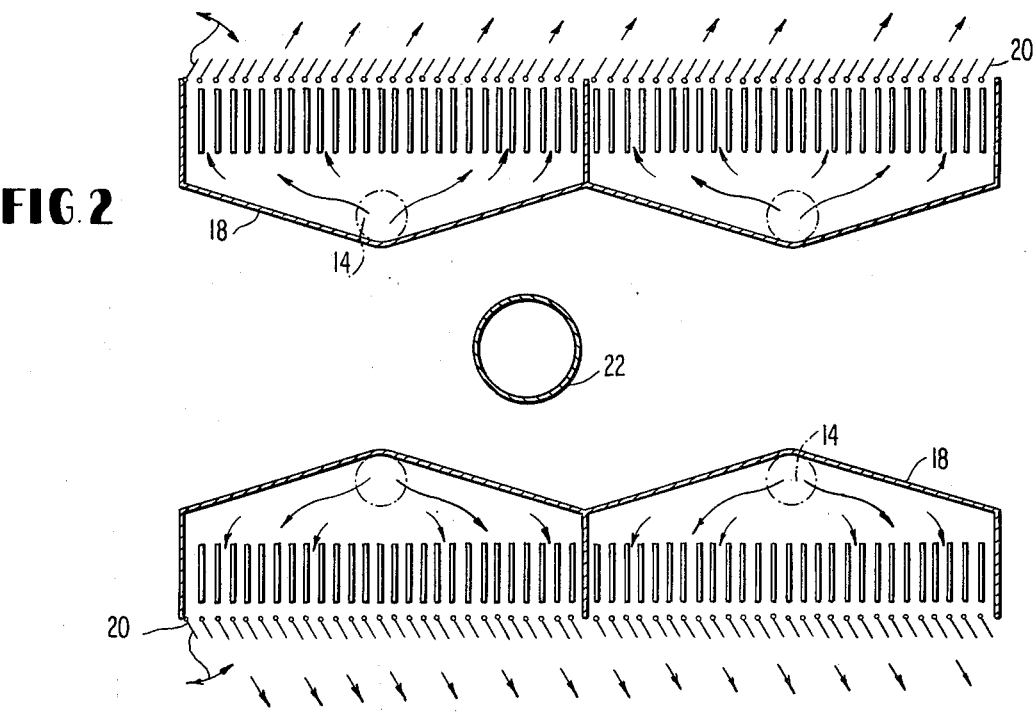
FIG. 2 is a horizontal sectional view of the heat exchangers for the warm water pumps, the view being taken on the line 2—2 of FIG. 1.

There is shown in FIG. 1 a segment of sea thermal power plant embodying an equipment deck 10 having associated therewith inlet screens 12 which permit the warm surface water of the sea to flow into the inlet pipes 14. The pipes are provided with axial flow propeller pumps 16, shown in dotted outline in FIG. 1, with said pipes terminating in evaporators or heat exchangers 18. The warm surface water discharged from the pipes 14 flows through or between the tubes or plates of the heat exchanger 18 giving up heat to the fluid in said tubes or plates after which the water is rejected from the evaporator or heat exchanger. The heat exchanger 18 is provided with adjustable louvres or deflectors 20 which can be arranged to direct the rejected water from the heat exchanger so as to produce a thrust. The thrust so derived can be directed by the deflectors in any desired direction. Thus, by directing the flow of water as it discharges from the evaporator or heat exchanger in a direction backward or rearward to the path of movement of the power plant a reaction force is produced so as to drive the power plant forward through the water. It should be borne in mind that the water entering the pipes 14 from the surface of the sea is drawn in under the action of the pumps 16 and is forced through the heat exchangers or evaporators by said pumps so that the water moves out of the evaporators or heat exchangers at some velocity due to the pump action. Since there is a large quantity of water flowing through the heat exchangers 18 under the action of the pumps 16, the water rejected from the heat exchangers will be flowing at considerable velocity. Thus, the velocity of the water leaving the heat exchangers may be higher than the desired velocity of the moving power plant and if this is the situation, then the louvres or deflectors 20 can be adjusted to control the direction in which the rejected water is being directed. In this manner, the angular relation or positioning of the louvres or deflectors 20 will tend to control, to a degree, the forward velocity of the power plant through the sea water.

Figure 3:
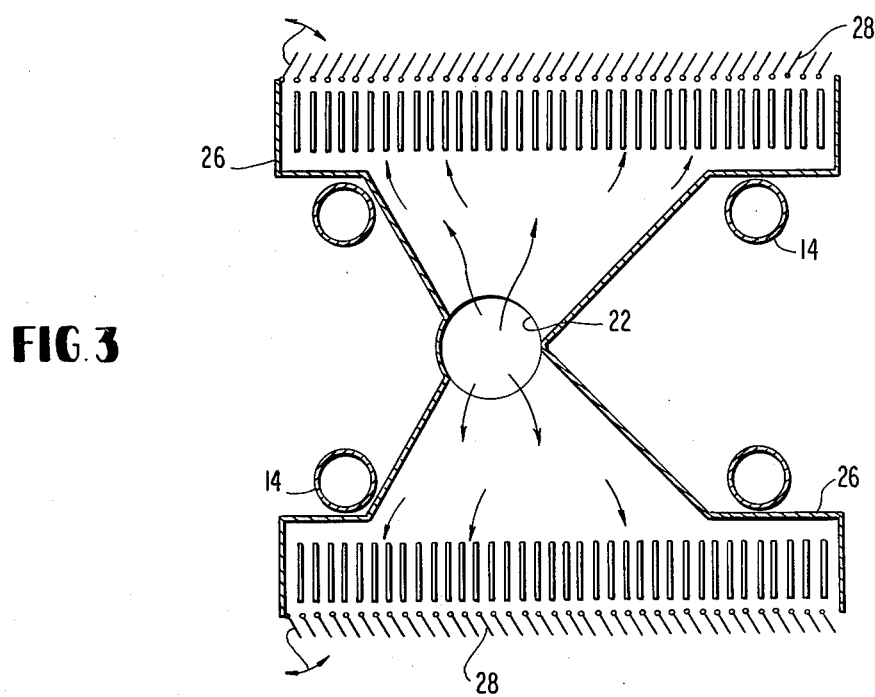
FIG. 3 is a horizontal sectional view of the heat exchanger for the cold water pump, the view being taken in the line 3—3 of FIG. 1.

The power plant is provided with a depending cold water pipe 22 which has positioned therein an axial flow propeller pump 24 of the same general type as the pumps 16 in the pipes 14. The cold water pipe 22 terminates in a condenser or heat exchanger 26. The condenser or heat exchanger 26 utilizes the cooler water from the cold water pump 24 to liquify a vaporized working fluid and like the heat exchangers 18 is provided with louvres or deflectors 28, FIG. 3, for directing the water discharged or rejected from the heat exchanger so as to produce a reaction force in the same manner and for the same purpose as the water discharged from the evaporators 18. Thus, the adjustable louvres 20 and 28 carried by the heat exchangers 18 and 26 permit directing the thrust from the heat exchangers in such a way as to produce thrust in any desired direction thereby producing forces to move the power plant or to position said plant with respect to ocean currents as so desired.

The pumps 24 and 16 are utilized respectively, to bring up cold water and force it through the condenser or heat exchanger and to pump warm water from the surface inlet down through the boilers or heat exchangers of the power plant. In order to provide for a greater thrust from the power plant so as to overcome the drag forces produced by wind and currents under high storm conditions, the pipes 22 and 14, downstream from the pumps 24 and 16, are formed with louvres or bypass thrust openings. In this manner, when high thrust is desired for the power plant, the louvres or vanes or thrust openings in the pipes 22 and 14 are opened so that water can be discharged directly from the pipes into the sea at the same time that some of the water continues to flow through the heat exchangers and into the sea. The pipes 14 and 22 are each provided with segments or sections 30, FIG. 4, that have louvres or bypass thrust openings in the form of pivotally mounted vanes 32 which can be opened to the full line position of FIG. 4 for discharging the greater portion of the water flowing through the pipe directly from the pipe into the sea, while the remaining portion of the water continues to flow through the respective heat exchangers 18 and 26. As a result of the foregoing arrangement, all of the pumps 16 and 24 can assist in producing higher thrust when it becomes necessary during such times when storms may occur. The vanes 32 may be actuated by any suitable means, not shown, for moving from the full line open position to the dotted line closed position or any intermediate position. During normal operation of the sea thermal power plant, the vanes 32 are moved to the dotted lined closed position of FIG. 4 so that all of the water flowing through the pipes 14 and 22 will be discharged into the sea through the respective heat exchangers 18 and 26.

Figure 6:
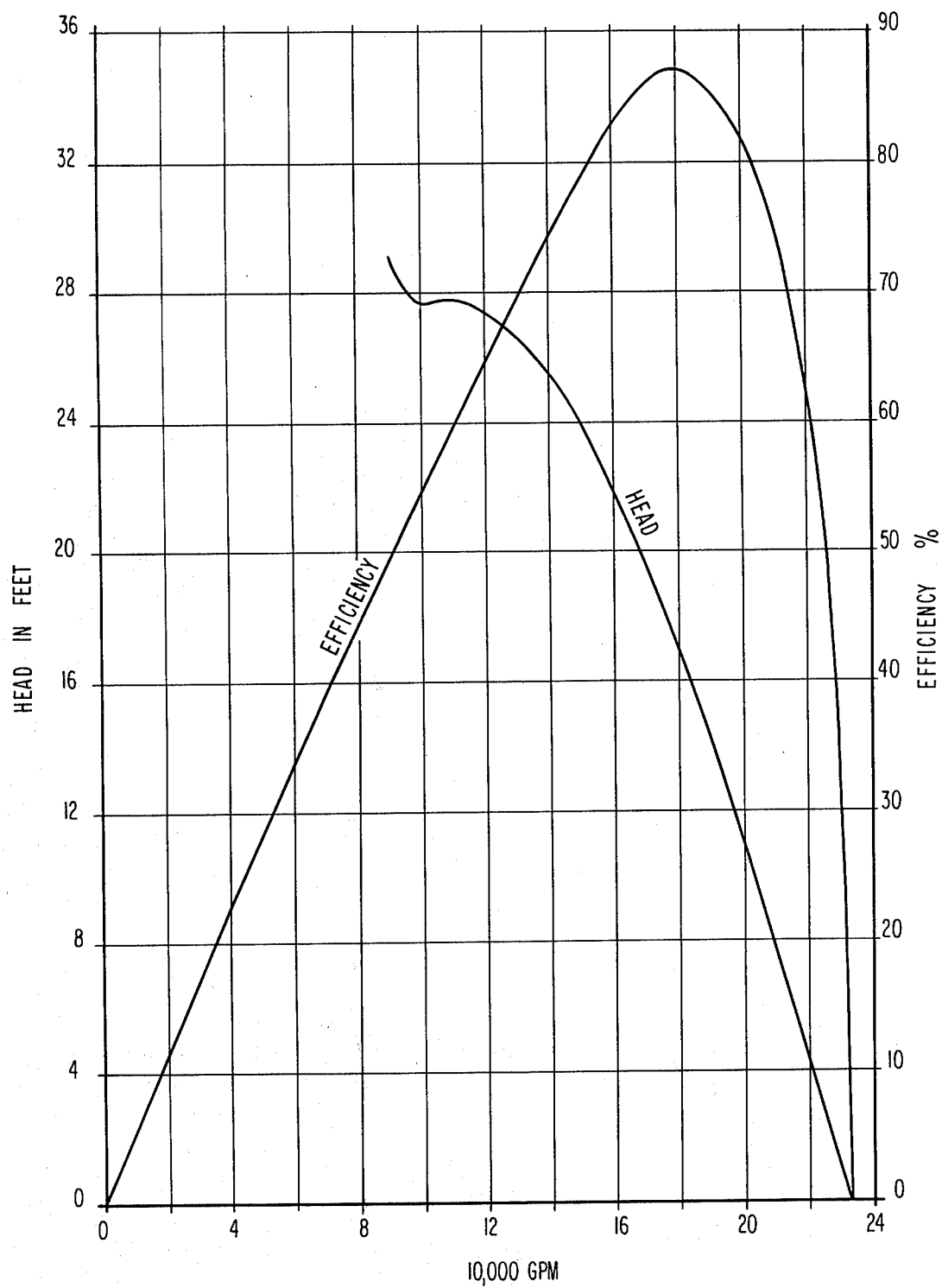
FIG. 6 is a chart plotting of head versus capacity and efficiency versus capacity for a typical propeller pump.
Figure 7:
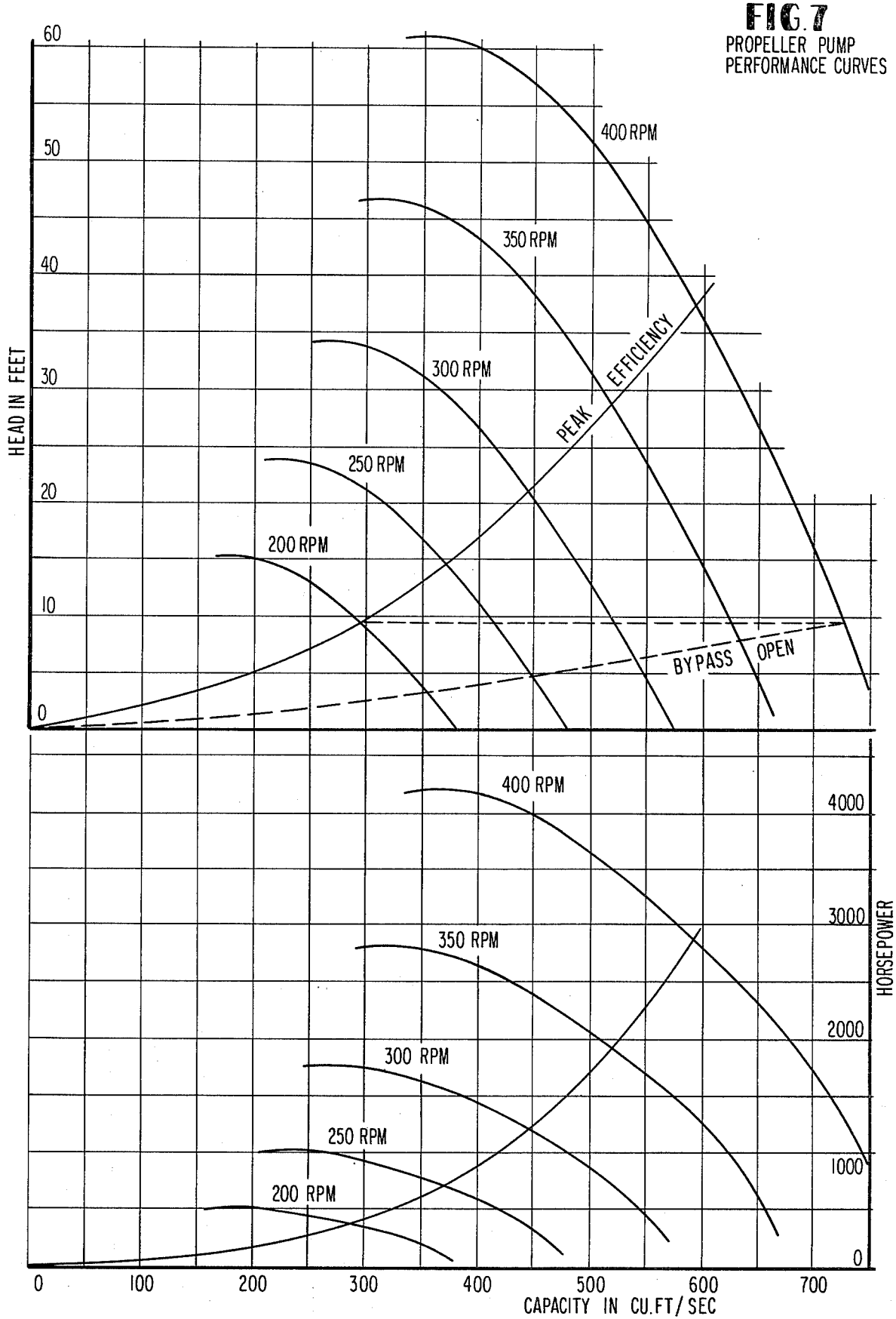
FIG. 7 discloses operating curves of a propeller pump which illustrate head versus capacity and horse power required versus capacity at varying speeds from 200 to 400 RPM.

In order to produce the higher thrust, a considerably higher flow through the pumps would be required than would be the case at normal operating conditions. Referring to FIG. 6, the head versus capacity and efficiency versus capacity are plotted for a typical propeller pump at 270 RPM. The peak efficiency curve occurs at 180,000 GPM where the pump operates at 87 percent efficiency; the head produced at this flow is 17 ft. In a propeller pump, the head produced is directly proportional to the square of the speed and the flow is directly proportional to the speed. Therefore, operating curves can be shown in FIG. 7 derived from the curves of FIG. 6 with the operating curves of FIG. 7 showing the head versus capacity and horse power required versus capacity at the varying speeds from 200 to 400 RPM. The operating point at peak efficiency is shown in FIG. 7, where, for example, at 200 RPM the pump would deliver 295 cu. ft./sec. at a head of 9.3 ft. and would require 380 hp. If the pump were to be operated at 400 RPM, it would deliver at the same peak efficiency condition 593 cu. ft./sec. at a head of 37.3 ft. and would require 2900 hp. The peak efficiency line can normally also represent the characteristic curve of frictional resistance to pump the water through the pipes 14 and 22 and the heat exchangers 18 and 26. Thus, if normal operation occurs at 200 RPM and the normal flow against the resistance of friction in the heat exchangers and pipes is such that the pump would deliver 295 cu. ft./sec., as shown at this peak efficiency point, then, if the pumps speed were increased to 400 RPM, it would then deliver 595 cu. ft./sec. at a resistance head of 37.3 ft. and would require 2900 HP. Thus, if one wanted to double the flow through the heat exchangers, thereby producing more thrust, it would require 2900 hp. as compared to only 380 hp. at normal operating conditions. It, therefore, becomes rather difficult and undesirable to try to speed up the pumps with operating flows going through the heat exchangers to develop high thrusts during storm conditions.

Figure 4:
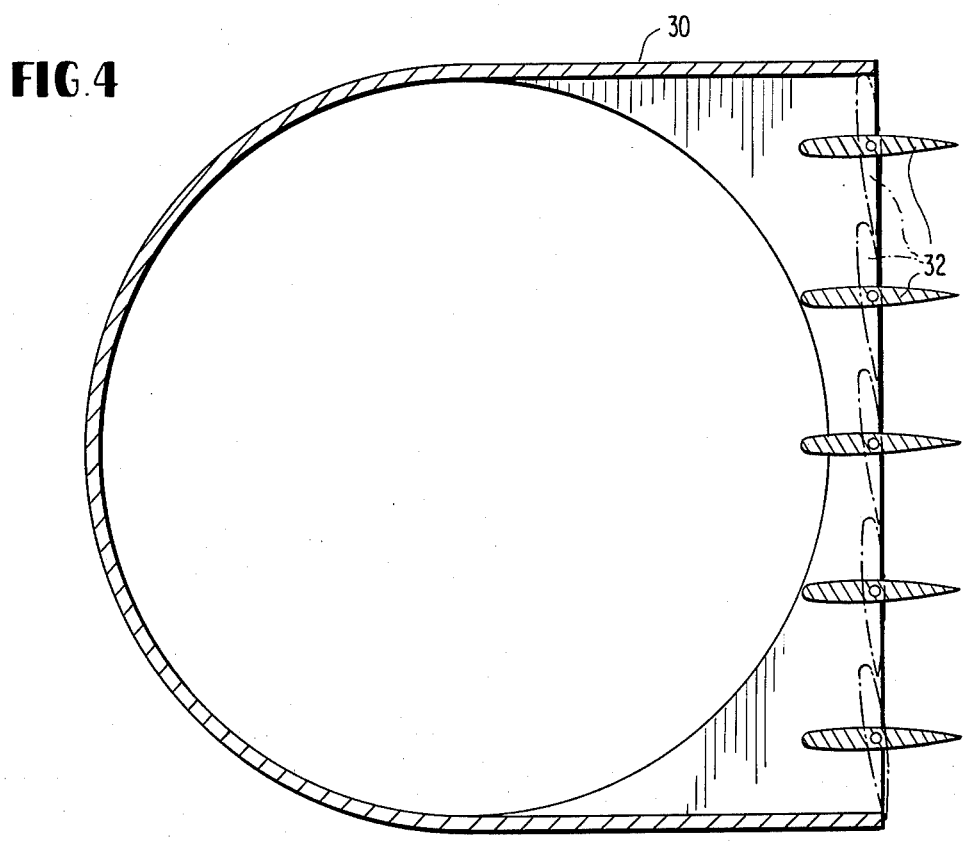
FIG. 4 is a horizontal sectional view of the vanes or bypass thrust openings on the various water pipes, the view being taken on line 4—4 of FIG. 1.

Instead of trying to speed up the pump and use excessive power to obtain more flow through the heat exchangers, the bypass louvres or vanes 32 are opened, by any suitable means, to the full line position of FIG. 4 so that the resistance to flow is reduced and it is possible to pass considerably more flow through the system at a much lower head. For example, if one wanted to maintain the same essential pressure drop across the heat exchangers or the same total head as the system was operating on normally, then one could make the bypass area, as defined by the louvres 32, large enough so that the combined resistance curve of the bypass and the heat exchangers would be as shown in dotted lines in FIG. 7 and marked "bypass open". This resistance line intersects the 400 RPM head line at 9.5 ft. head and under these conditions, the flow would then be 725 cu. ft./sec. or 2.46 times as much as the flow under normal operating conditions. At the 400 RPM and the head of 9.5 ft., the pump would require 1300 hp. This means that a much higher flow would be generated per unit of horse power at the conditions with the bypass louvres 32 open so that more thrust could be generated and thus be available for emergency conditions such as when storms may occur.

Figure 5:
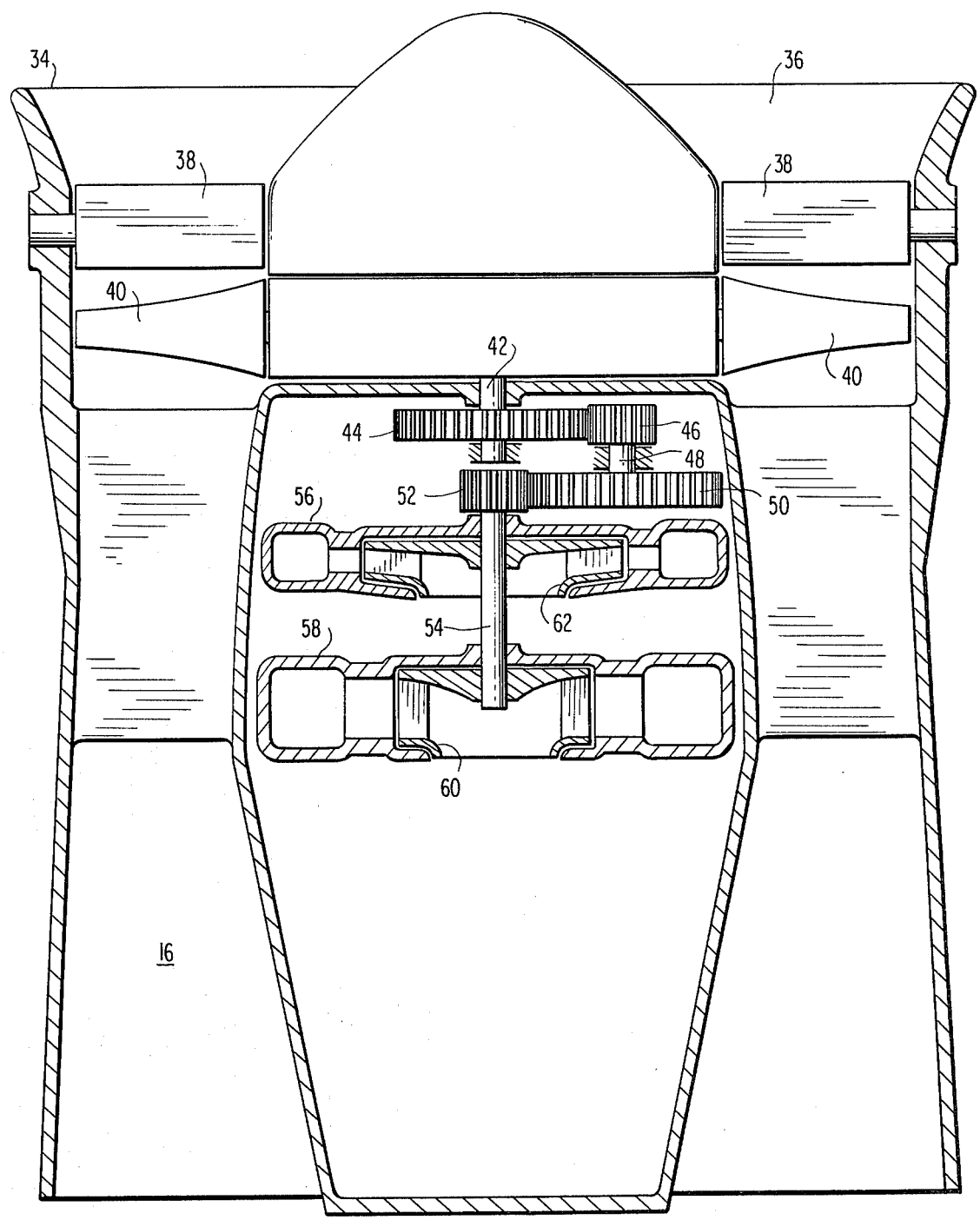
FIG. 5 is a vertical sectional view of a propeller pump that may be used with the present invention.

There is shown in FIG. 5 a sectional view through a propeller pump 16 or 24 which might be used in the pipes 14 and 22. The axial pump 16 or 24 is provided with a suitable casing or housing 34 that is formed with an inlet 36 which is provided with vanes 38 which can adjustably direct the flow of water into the propeller blade 40. The pump is normally required to rotate at a very low speed while the desirable speeds for the turbines are much higher. Thus, the pump 16 or 24 is shown with a two-stage step-down gear arrangement permitting the turbines to run at a much higher rotating speed than the pump propeller. In this connection, a propeller shaft 42 is supported in suitable bearings and carries a gear 44 that meshes with a pinion gear carried by a shaft 48 that is supported in suitable bearings. The shaft 48 also has mounted thereon a gear 50 that meets with a gear 52 carried by a shaft 54.

In order to provide for the excessive power that is required when storm conditions occur and high thrust is required, the shaft 54 has mounted thereon a main turbine 56 and an auxiliary turbine 58 which are arranged in vertical spaced relation to one another. The main turbine 56 would drive the pump propeller 40 under normal operating conditions while the auxiliary turbine 58 would be placed into service to increase the power during the time when high thrust is required. In this connection, the auxiliary turbine 58 is considerably smaller in diameter at the turbine wheel 60 than is the turbine wheel 62 for the main turbine 56. This permits the velocity of the turbine wheel 60 at a higher RPM to operate more efficiently so that the turbine 58 can operate at a good efficiency when the speed is in excess of the normal speed of the turbine 56. It is to be noted, however, that the main turbine 56 is larger in diameter so that its tip is in the range of high efficiency during the slower speed for normal operation. Furthermore, the turbine 58 is disclosed as having a wider wheel 60 and, therefore, larger flow capacity in order to supply the large increase in horse power required for operating at the high speed when high thrust is required.

Thus, the sea thermal power plant is capable of producing thrust by controlling the direction of the water rejected from the heat exchangers as a result of the use of the louvres or deflectors 20 and 28 in conjunction with the heat exchangers 18 and 26. Under normal conditions the louvres or deflectors 20 and 28 would enable the power plant to move through the surface of the water under the force derived from the water being ejected from the heat exchangers through the louvres or deflectors. The thrust so produced would permit the power plant to be moved or positioned with respect to ocean currents as desired. In situations wherein it would be desirable to produce higher thrust, such as times during storms or the like, the vanes or bypass louvres 32 in the pipes 14 and 22 would be opened so that the greater portion of the water flowing through the pipes 14 and 26 would be discharged directly into the sea thereby providing greater thrust while at the same time a portion of the water flowing through the pipes 14 and 22 would continue to flow through the heat exchangers and against and through the louvres or deflectors 20 and 28. In addition, during the periods when higher thrust is required, the pumps would be driven by both the main and auxiliary turbines to increase the power of said pumps when storm conditions occur and high thrust is required.

Although the foregoing description is necessarily of a detailed character, in order that the invention may be completely set forth, it is to be understood that the specific terminology is not intended to be restrictive or confining, and that various rearrangements or parts and modifications of detail may be resorted to without departing from the scope or spirit of the invention as herein claimed.

I claim:

1. In a sea thermal power plant having depending inlet pipes terminating in heat exchangers having adjustable deflectors with a pump in said pipes for forcing water through said pipes and heat exchangers to produce thrust directed by said deflectors in any desired direction for moving the plant over the water surface, means provided in said pipes downstream of said pumps for directing the greater portion of the water flowing through said pipes into the sea under the action of said pumps to produce higher thrust than that obtainable through the heat exchangers.

2. In a sea thermal power plant as defined in claim 1 wherein said means includes pivotally mounted vanes or bypass louvres.

3. In a sea thermal power plant as defined in claim 2 wherein said pivotally mounted bypass louvres in their opened position reduce the resistance to flow of water through said pumps and pipes and into the sea.

4. In a sea thermal power plant as defined in claim 3 wherein said bypass louvres in their opened position permit a greater flow of water through the pipes and pumps at a much lower head than when said louvres are in a closed position.

5. In a sea thermal power plant as defined in claim 3 wherein said pump is an axial flow propeller pump having a two stage stepped down gear train.

6. In a sea thermal power plant as defined in claim 5 wherein said pump is driven by a pair of axially disposed turbines constituting a main and an auxiliary turbine.

7. In a sea thermal power plant as defined in claim 6 wherein said main turbine has a turbine wheel of a larger diameter than the turbine wheel of the auxiliary turbine and said pump with said bypass louvres in a closed position is driven by the main turbine.

8. In a sea thermal power plant as defined in claim 7 wherein said auxiliary turbine is provided with a wider turbine wheel than said main turbine to provide for a larger flow capacity when said bypass louvres are opened.

* * * * *